(12) United States Patent
Nyamwange et al.

(10) Patent No.: US 12,468,549 B2
(45) Date of Patent: Nov. 11, 2025

(54) AUTOMATED SYSTEM FOR RESTARTING LARGE SCALE CLUSTER SUPERCOMPUTERS

(71) Applicant: BANK OF AMERICA CORPORATION, Charlotte, NC (US)

(72) Inventors: Elvis Nyamwange, Little Elm, TX (US); Sailesh Vezzu, Hillsborough, NJ (US); Amer Ali, Jersey City, NJ (US); Rahul Shashidhar Phadnis, Charlotte, NC (US); Rahul Yaksh, Austin, TX (US); Hari Vuppala, Concord, NC (US); Pratap Dande, Saint Johns, FL (US); Brian Neal Jacobson, Los Angeles, CA (US); Erik Dahl, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 153 days.

(21) Appl. No.: 18/209,012

(22) Filed: Jun. 13, 2023

(65) Prior Publication Data

US 2024/0419454 A1    Dec. 19, 2024

(51) Int. Cl.
   *G06F 9/4401*    (2018.01)

(52) U.S. Cl.
   CPC ............ *G06F 9/4416* (2013.01); *G06F 9/442* (2013.01)

(58) Field of Classification Search
   CPC .... G06F 11/1433; G06F 9/4416; G06F 9/442; G06F 11/142; G06F 11/1438; G06F 11/1441
   See application file for complete search history.

(56) References Cited

U.S. PATENT DOCUMENTS

| | | | |
|---|---|---|---|
| 7,765,435 B2 | 7/2010 | Taylor | |
| 7,984,282 B2 | 7/2011 | George | |
| 8,307,243 B2 | 11/2012 | Archer | |
| 9,021,299 B2 | 4/2015 | Douros | |
| 9,274,902 B1 * | 3/2016 | Morley | G06F 11/079 |
| 9,971,713 B2 | 5/2018 | Asaad | |
| 10,025,639 B2 | 7/2018 | Kozloski | |
| 10,423,428 B2 | 9/2019 | Georges | |
| 10,599,544 B2 | 3/2020 | Zhang | |
| 10,606,681 B2 | 3/2020 | Boenisch | |
| 10,860,367 B2 * | 12/2020 | Mani | G06F 9/4856 |
| 10,924,368 B1 | 2/2021 | Kaddoura | |
| 11,270,193 B2 | 3/2022 | Modha | |
| 11,327,796 B2 | 5/2022 | Quintin | |
| 11,334,392 B2 | 5/2022 | Quintin | |
| 11,860,754 B2 | 1/2024 | Murray | |

(Continued)

*Primary Examiner* — Hyun Soo Kim
(74) *Attorney, Agent, or Firm* — Moore & Van Allen PLLC; Anup Iyer

(57) ABSTRACT

Systems, computer program products, and methods are described herein an automated system for restarting large scale cluster supercomputers. The present disclosure is configured to receive a request to reboot a supercomputer cluster, wherein the request comprises a sequence of reboot instructions; determine, using a data integrity engine, whether a current state of the supercomputer cluster meets reboot requirements, wherein the reboot requirements are associated with a core logic of the data integrity engine; and execute the sequence of reboot instructions in an instance where the current state of the supercomputer cluster meets the reboot requirements.

16 Claims, 5 Drawing Sheets

(56) References Cited

U.S. PATENT DOCUMENTS

| | | |
|---|---|---|
| 2003/0005068 A1 | 1/2003 | Nickel |
| 2010/0251259 A1 | 9/2010 | Howard |
| 2013/0080482 A1 | 3/2013 | Berkowitz |
| 2014/0278340 A1 | 9/2014 | Berkowitz |
| 2014/0372586 A1 | 12/2014 | Tannenbaum |
| 2019/0220285 A1* | 7/2019 | Ali ........................ G06F 9/4401 |
| 2019/0332481 A1* | 10/2019 | Kulick ................. G06F 11/0793 |
| 2020/0389521 A1* | 12/2020 | Brock ....................... H04L 9/50 |
| 2021/0357270 A1* | 11/2021 | Karnawat ............. G06F 9/5088 |

\* cited by examiner

AUTOMATED SYSTEM FOR RESTARTING LARGE SCALE CLUSTER SUPERCOMPUTERS

TECHNOLOGICAL FIELD

Example embodiments of the present disclosure relate to an automated system for restarting large scale cluster supercomputers.

BACKGROUND

Managing large-scale cluster supercomputers involves handling intricate hardware and software systems, maintaining their robust network structures, performing routine updates and security patches, and ensuring optimal utilization of resources through job scheduling. The process of restarting these supercomputers is especially complex, requiring meticulous attention to preserving hardware and data integrity, minimizing downtime, managing running and queued jobs, reestablishing network configurations, and/or the like. Given these complexities, there is a need for an automated system that can streamline the process of restarting supercomputers, reducing potential errors, and enhancing overall system efficiency.

Applicant has identified a number of deficiencies and problems associated with restarting large scale cluster supercomputers. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for an automated system for restarting large scale cluster supercomputers.

In one aspect, a system an automated system for restarting large scale cluster supercomputers is presented. The system comprising: a processing device; a non-transitory storage device containing instructions when executed by the processing device, causes the processing device to: receive a request to reboot a supercomputer cluster, wherein the request comprises a sequence of reboot instructions; determine, using a data integrity engine, whether a current state of the supercomputer cluster meets reboot requirements, wherein the reboot requirements are associated with a core logic of the data integrity engine; and execute the sequence of reboot instructions in an instance where the current state of the supercomputer cluster meets the reboot requirements.

In some embodiments, executing the instructions further causes the processing device to: receive, from a user input device, the sequence of reboot instructions; and store the sequence of reboot instructions in a reboot sequence repository.

In some embodiments, executing the instructions further causes the processing device to: receive, from the user input device, the request to reboot the supercomputer cluster; and retrieve, from the reboot sequence repository, the sequence of reboot instructions in response to receiving the request.

In some embodiments, executing the instructions further causes the processing device to: determine, from the current state of the supercomputer cluster, computational tasks currently being processed by the supercomputer cluster; and retrieve information associated with the computational tasks currently being processed by the supercomputer cluster.

In some embodiments, the information associated with the computational tasks comprises at least a task priority, a task criticality, a task duration, and computational resource requirement.

In some embodiments, the data integrity engine comprises at least a holochain application.

In some embodiments, executing the instructions further causes the processing device to: determine that the request is a valid signed entry; and transmit the request and the current state of the supercomputer cluster to a distributed hash table (DHT) associated with the data integrity engine.

In some embodiments, executing the instructions further causes the processing device to: receive, from a plurality of peer computing nodes, an indication that the current state of the supercomputer cluster meets the reboot requirements; determine that a total number of the plurality of peer computing nodes indicating that the current state of the supercomputer cluster meets the reboot requirements is greater than a predetermined threshold; and determine a confirmation that the current state of the supercomputer cluster meets the reboot requirements in an instance in which the total number of the plurality of peer computing nodes is greater than the predetermined threshold.

In yet another aspect, a computer program product an automated system for restarting large scale cluster supercomputers is presented. The computer program product comprising a non-transitory computer-readable medium comprising code causing an apparatus to: receive a request to reboot a supercomputer cluster, wherein the request comprises a sequence of reboot instructions; determine, using a data integrity engine, whether a current state of the supercomputer cluster meets reboot requirements, wherein the reboot requirements are associated with a core logic of the data integrity engine; and execute the sequence of reboot instructions in an instance where the current state of the supercomputer cluster meets the reboot requirements.

In yet another aspect, a method an automated system for restarting large scale cluster supercomputers is presented. The method comprising: receiving a request to reboot a supercomputer cluster, wherein the request comprises a sequence of reboot instructions; determining, using a data integrity engine, whether a current state of the supercomputer cluster meets reboot requirements, wherein the reboot requirements are associated with a core logic of the data integrity engine; and executing the sequence of reboot instructions in an instance where the current state of the supercomputer cluster meets the reboot requirements.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 2:
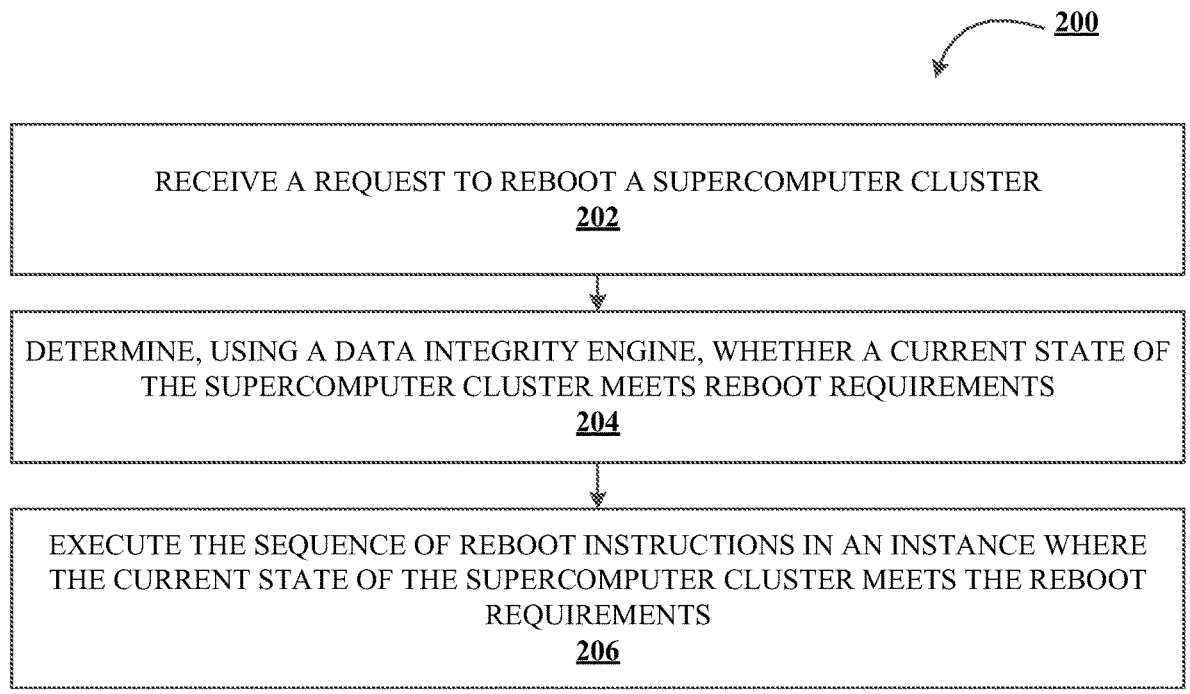

FIGS. 1A-1D illustrates technical components of an exemplary distributed computing environment for an automated system for restarting large scale cluster supercomputers, in accordance with an embodiment of the disclosure;

FIG. 2 illustrates a process flow for an automated system for restarting large scale cluster supercomputers, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Large-scale supercomputers (or supercomputer clusters) are high-performance computing (HPC) systems that may comprise of a group of computing devices or "nodes" working in conjunction to perform complex computations more rapidly than would be possible with a single computing device. Maintenance and patching of such supercomputers are crucial activities that help ensure these devices continue to run smoothly and securely. Similar to most computing devices, supercomputers run on software that needs to be regularly updated and patched. Examples of such software include operating system, drivers, middleware, job schedulers, compilers, libraries, application software, and/or the like. Due to the complexity of supercomputers, installing new patches and/or updates often requires restarting the supercomputers. Given the complexity of these systems, improper restarts can lead to a variety of problems, from hardware damage and software malfunctions to data inconsistency and prolonged downtime.

One of the most important considerations when considering a supercomputer restart is job management. Job management in the context of supercomputers refers to the organization, scheduling, and execution of computational tasks, or "jobs", on the supercomputer. These jobs could be anything from scientific simulations and data analysis tasks to AI training algorithms, and they can range greatly in terms of complexity, runtime, and computational requirements. In an example supercomputer environment, jobs are typically assigned a priority level based on various factors like the user's role, project deadlines, the job's importance, or pre-defined scheduling policies. Before a planned restart, administrators are required to review the priorities of running and queued jobs. Supercomputers often handle hundreds or even thousands of jobs at a time, each with varying priorities, resource requirements, and runtimes. Understanding the current state of all these jobs and making decisions based on this information can be a complex task. Different users and projects have different priorities and deadlines. Balancing these needs against the requirement for a restart can be challenging. To make informed decisions, administrators need to understand the characteristics of each job, including the job's resource requirements, expected runtime, whether it can be paused and resumed (checkpointed), how sensitive it is to delays, and/or the like. Gathering such information can be a time-consuming process. Some jobs might not be easily paused and resumed, or they might need to run continuously for a long period to produce useful results. This could limit the options available for managing these jobs during the restart. Given the complexity of the task, there's always a chance that an error could occur, such as a job being incorrectly terminated, or a high-priority job being delayed. These errors could have serious consequences, particularly for time-sensitive or critical jobs. Therefore, there is a need for an automated system for restarting large scale cluster supercomputers.

The present disclosure provides a technical solution to the technical problem detailed above. The technical solution presented herein is an improvement over existing solutions to restart supercomputers. By removing manual input and waste from the implementation of the solution, embodiments of the present invention improve the speed and efficiency of the process and conserves computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
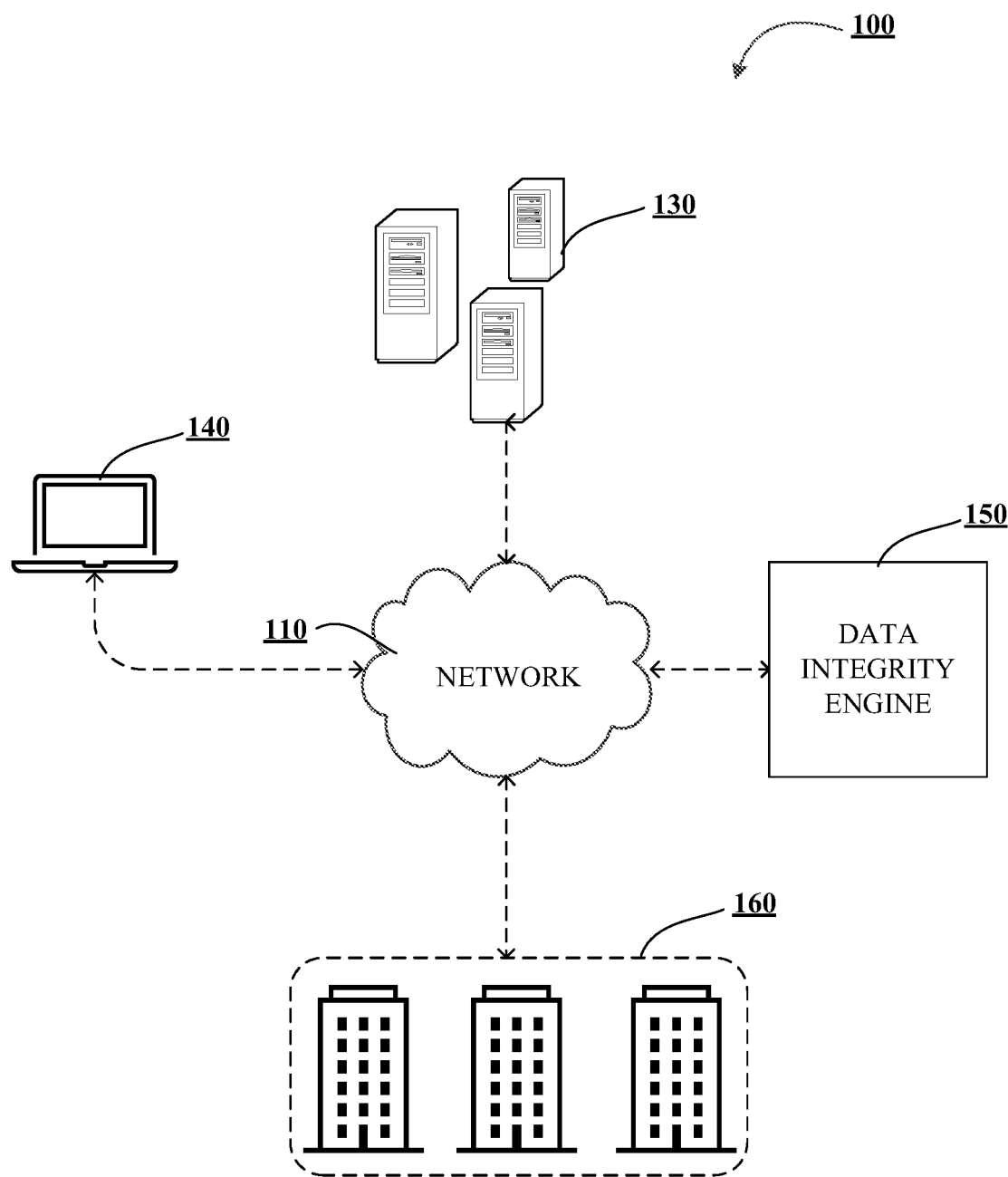

FIGS. 1A-1D illustrate technical components of an exemplary distributed computing environment an automated system for restarting large scale cluster supercomputers 100, in accordance with an embodiment of the disclosure. As shown in FIG. 1A, the distributed computing environment 100 contemplated herein may include a system 130, an end-point device 140, a data integrity engine 150, a supercomputer cluster 160, and a network 110 over which the system 130, the end-point device 140, the data integrity engine 150, and the supercomputer cluster 160 communicate therebetween. FIG. 1A illustrates only one example of an embodiment of the distributed computing environment 100, and it will be appreciated that in other embodiments one or more of the systems, devices, supercomputer clusters, distributed ledger networks, networks, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 may have a client-server relationship with the end-point device 140, the data integrity engine 150, and the supercomputer cluster 160 in which the end-point device 140, the data integrity engine 150, and the supercomputer cluster 160 are remote devices that request and receive service from a centralized server, i.e., the system 130. In some other embodiments, the system 130 may have a peer-to-peer relationship with the end-point device 140, the data integrity engine 150, and the supercomputer cluster 160 in which the system 130, the end-point device 140, the data integrity engine 150, and the supercomputer cluster 160 are considered equal and all have the same abilities to use the resources available on the network 110. Instead of having a central server (e.g., system 130) which would act as the shared drive, each device that is connected to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The data integrity engine 150 may refer to protocols and supporting infrastructure that allow computing devices (peers) associated therewith to propose and validate a task. For example, and as described in more detail herein, the proposed task may be rebooting a supercomputer cluster, and the validation process may include determining whether a current state of a supercomputer cluster meets specific reboot requirements. In some embodiments, the data integrity engine 150 may include a holochain application (hApp), a decentralized application built on the holochain framework. Each hApp operates according to its own set of rules and protocols, known as its core logic, which governs the behavior of the application and the validation of tasks. Unlike traditional applications, which rely on a central server or a single shared ledger, a hApp uses a unique combination of local chains and a Distributed Hash Table (DHT) to store data. Every user, or node, maintains their own local chain, storing their transactions or interactions. This data, after being validated against the hApp's core logic rules, is then shared to the DHT, a resilient, peer-to-peer network where data is stored across multiple nodes. This architecture allows for significant scalability and efficiency, as tasks can be processed in parallel, and validation does not require the participation of all the computing devices.

The supercomputer cluster 160 may refer to powerful computing systems composed of numerous interconnected nodes, each of which contains one or more processors (CPUs or GPUs), memory, and other components. These nodes may be configured to work in unison, processing enormous amounts of data and executing complex computations simultaneously. Their network architecture, often a high-speed interconnect, ensures efficient communication between nodes, allowing the system to operate as a cohesive unit. Supercomputer clusters 160 are frequently employed in fields requiring high computational power, such as weather forecasting, scientific research, artificial intelligence, and big data analytics. Given their complexity and scale, the management, operation, and maintenance of these supercomputer clusters 160 are non-trivial tasks, demanding careful planning and expert handling.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

Figure 1B:
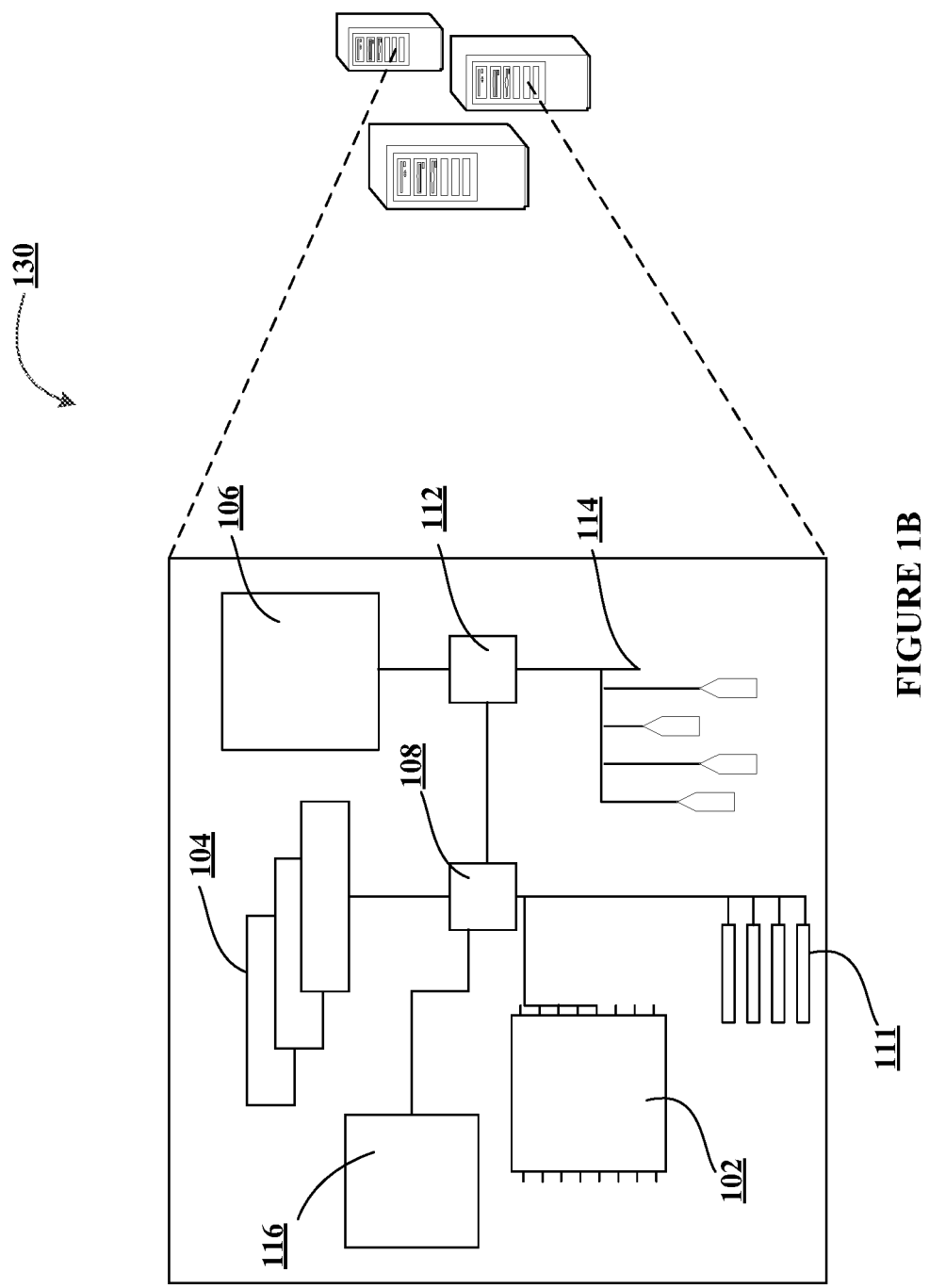

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

Figure 1C:
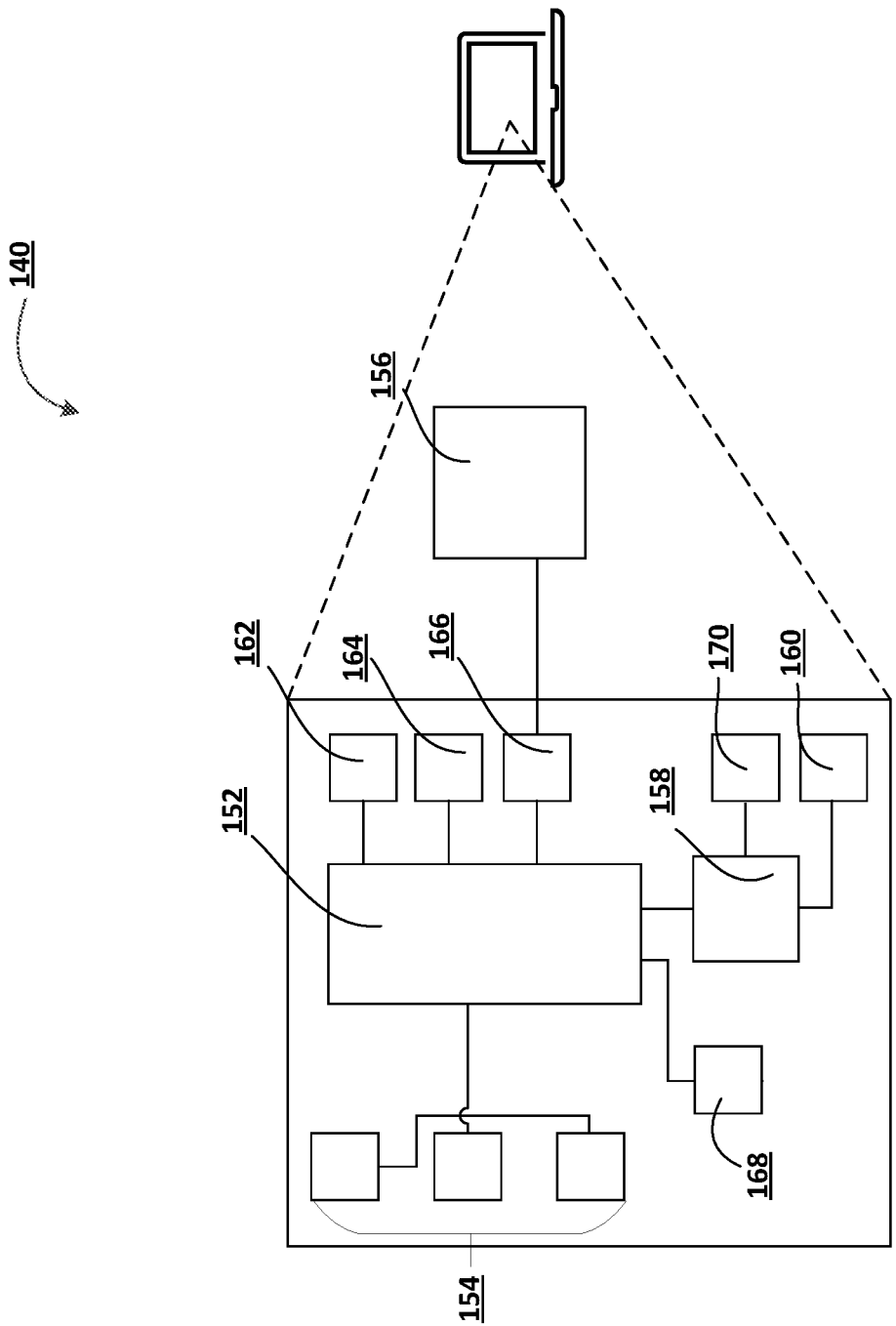

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 1D:
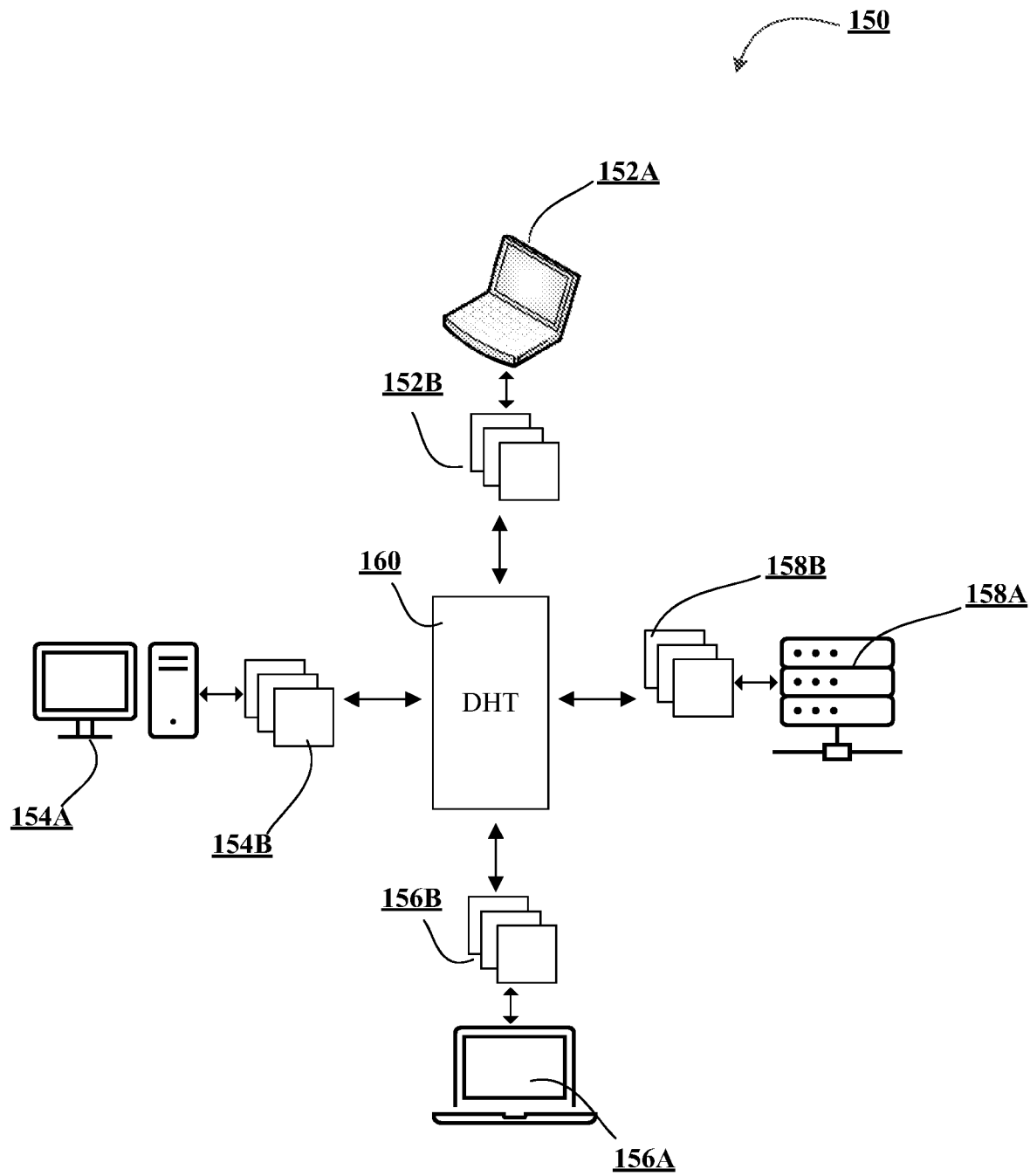

FIG. 1D illustrates an exemplary peer-to-peer network associated with the data integrity engine 150, in accordance with an embodiment of the disclosure. As shown in FIG. 1D, the peer-to-peer network may include nodes 152A, 154A, 156A, 158A. For example, these nodes 152A, 154A, 156A, 158A may be computing devices such as system 130 and/or end-point device 140. In some embodiments, nodes may refer to individual participants or users of a specific hApp. Each node represents an active entity in the network, capable of producing, validating, and storing tasks. Each node (e.g., 152A, 154A, 156A, 158A) maintains their own local chain of tasks or entries 152B, 154B, 156B, 158B, which are made during their interaction with the hApp. Each task is signed with the node's private key, providing a cryptographic assurance of its source, and ensuring the task hasn't been tampered with. After local validation against the rules (e.g., reboot requirements) specified in the hApp's core logic, this task is shared to the Distributed Hash Table (DHT) 160. Nodes 152A, 154A, 156A, 158A play a crucial role in maintaining the DHT, as they not only contribute data but also store a portion of the DHT's data on their own devices, ensuring redundancy and resilience. Nodes 152A, 154A, 156A, 158A independently validate tasks they receive from other nodes against their copy of the hApp's core logic rules, contributing to the distributed consensus mechanism that holochain uses.

FIG. 2 illustrates a process flow for an automated system for restarting large scale cluster supercomputers, in accordance with an embodiment of the disclosure. As shown in block 202, the process flow includes receiving a request to reboot a supercomputer cluster. In some embodiments, the request may include a sequence of reboot instructions that may be necessary to restart the supercomputer cluster safely and effectively. For example, the sequence of reboot instructions may cover the shutdown of running services and processes, saving any necessary state information, bringing down the various components in an appropriate order to avoid damage or data loss, and then bringing those components back online in a correct sequence. It would also cover checks to verify that each stage has been completed successfully. In some other embodiments, the system may receive the sequence of reboot instructions from a user input device (e.g., a node associated with the DHT) prior to receiving the request to reboot. In response to receiving the sequence of reboot instructions, the system may store the sequence of reboot instructions in a reboot sequence repository. When the system receives the request in due course, the system may retrieve the sequence of reboot instructions from the reboot sequence repository.

Next, as shown in block 204, the process flow includes determining, using a data integrity engine, whether a current state of the supercomputer cluster meets reboot requirements. In some embodiments, a state of a supercomputer cluster may refer to an operational condition of status of the supercomputer cluster at any given time. Various factors may be used to determine the state of a supercomputer cluster. These factors include, hardware status-operational status of the hardware components such as processors (CPUs/GPUs), memory, disks, power supplies, network interfaces, and interconnects, including any faults or errors in these components, and details such as power usage, software status-status of the operating system, system services, and any application software running on the cluster, including any software errors or faults, and the usage of system resources such as CPU and memory, computational tasks currently running on the supercomputer cluster-number of running jobs, queued jobs, completed jobs, failed jobs, and the resources allocated to each job, information associated with each computation task-a task priority, a task criticality, a task duration, computational resource requirement, and/or the like, network status-status of the cluster's network connections, both internally between nodes, and externally to other systems, including any network errors or faults, and network performance metrics such as latency and bandwidth, storage status-condition of the data storage systems, including the available storage space, used space, data read/write rates, and any errors or faults in the storage system, security status, security-related issues or events on the cluster, such as detected intrusion attempts, logged security incidents, or the status of security updates and patches, environmental status-status of environmental control systems such as cooling and power, and metrics such as humidity, and power usage, and/or the like.

In some embodiments, the state of the supercomputer cluster at any given time may be determined using collection agents. Collection agents may include one or more components services running on each node (the basic "element" of a cluster) that are responsible for gathering data about the state of that node. These agents actively monitor the system, capturing a broad range of information that represents the current state of each node. In example embodiments, the collection agents collect data on CPU and memory usage, disk space, network traffic, running jobs, and any system errors or warnings. Collection agents may be part of the operating system, part of the job scheduling system, or they might be standalone software specifically designed for system monitoring and management.

In some embodiments, the reboot requirements may be stored in the core logic of the data integrity engine. Reboot requirements may refer to conditions and steps necessary for safely and effectively restarting a computer system, such as a large-scale cluster supercomputer. These reboot requirements aim to minimize disruption and prevent data loss or hardware damage during the restart process. In example embodiments, the reboot requirements may include several factors such as reason for restart-a crucial system update, a critical security patch, a change in physical infrastructure, diagnosing a persistent system issue, and/or the like, user notification-users should be notified well in advance of the scheduled restart to allow them to save work, submit jobs with the restart in mind, or reschedule tasks, job management-jobs currently running on the supercomputer need to be managed to prevent data loss, including pausing (if supported), re-queuing, waiting for jobs to finish before the restart, and/or the like, data backup-essential data should be backed up before the restart to prevent data loss in case of an unexpected issue, system state documentation, contingency planning for potential issues during the restart process, such as a component failing to shut down or start up correctly, loss of network connectivity, or data corruption, and/or the like.

As described herein, the data integrity engine may include a hApp, a decentralized application built on the holochain framework. In determining whether a current state of the supercomputer cluster meets reboot requirements, the system may determine that the request is a valid signed entry, and in response, transmit the request and the current state of the supercomputer cluster to a DHT associated with the data integrity engine. In some embodiments, the system may receive, from a plurality of peer computing nodes, an indication that the current state of the supercomputer cluster meets the reboot requirements. In response, the system may determine that a total number of the plurality of peer computing nodes indicating that the current state of the supercomputer cluster meets the reboot requirements is greater than a predetermined threshold. Then, the system may determine a confirmation that the current state of the supercomputer cluster meets the reboot requirements in an instance in which the total number of the plurality of peer computing nodes is greater than the predetermined threshold.

As shown in block 206, the process flow may include executing the sequence of reboot instructions in an instance where the current state of the supercomputer cluster meets the reboot requirements.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system an automated system for restarting large scale cluster supercomputers, the system comprising:
    a processing device;
    a non-transitory storage device containing instructions when executed by the processing device, causes the processing device to:
    receive a request to reboot a supercomputer cluster, wherein the request comprises a sequence of reboot instructions;
    determine, using a data integrity engine, whether a current state of the supercomputer cluster meets reboot requirements, wherein the reboot requirements are associated with a core logic of the data integrity engine, wherein the data integrity engine is a holochain application; and
    execute the sequence of reboot instructions in an instance where the current state of the supercomputer cluster meets the reboot requirements, wherein executing further comprises retrieving information associated with computational tasks currently being processed by the supercomputer cluster, wherein the information associated with the computational tasks comprises at least a task priority, a task criticality, a task duration, and computational resource requirement.

2. The system of claim 1, wherein executing the instructions further causes the processing device to:
    receive, from a user input device, the sequence of reboot instructions; and
    store the sequence of reboot instructions in a reboot sequence repository.

3. The system of claim 2, wherein executing the instructions further causes the processing device to:
    receive, from the user input device, the request to reboot the supercomputer cluster; and
    retrieve, from the reboot sequence repository, the sequence of reboot instructions in response to receiving the request.

4. The system of claim 1, wherein executing the instructions further causes the processing device to:
    determine, from the current state of the supercomputer cluster, computational tasks currently being processed by the supercomputer cluster.

5. The system of claim 1, wherein executing the instructions further causes the processing device to:
    determine that the request is a valid signed entry; and
    transmit the request and the current state of the supercomputer cluster to a distributed hash table (DHT) associated with the data integrity engine.

6. The system of claim 5, wherein executing the instructions further causes the processing device to:
    receive, from a plurality of peer computing nodes, an indication that the current state of the supercomputer cluster meets the reboot requirements;
    determine that a total number of the plurality of peer computing nodes indicating that the current state of the supercomputer cluster meets the reboot requirements is greater than a predetermined threshold; and determine a confirmation that the current state of the supercomputer cluster meets the reboot requirements in an instance in which the total number of the plurality of peer computing nodes is greater than the predetermined threshold.

7. A computer program product an automated system for restarting large scale cluster supercomputers, the computer program product comprising a non-transitory computer-readable medium comprising code causing an apparatus to:
receive a request to reboot a supercomputer cluster, wherein the request comprises a sequence of reboot instructions;
determine, using a data integrity engine, whether a current state of the supercomputer cluster meets reboot requirements, wherein the reboot requirements are associated with a core logic of the data integrity engine, wherein the data integrity engine is a holochain application; and
execute the sequence of reboot instructions in an instance where the current state of the supercomputer cluster meets the reboot requirements, wherein executing further comprises retrieving information associated with computational tasks currently being processed by the supercomputer cluster, wherein the information associated with the computational tasks comprises at least a task priority, a task criticality, a task duration, and computational resource requirement.

8. The computer program product of claim 7, wherein the code further causes the apparatus to:
receive, from a user input device, the sequence of reboot instructions; and
store the sequence of reboot instructions in a reboot sequence repository.

9. The computer program product of claim 8, wherein the code further causes the apparatus to:
receive, from the user input device, the request to reboot the supercomputer cluster; and
retrieve, from the reboot sequence repository, the sequence of reboot instructions in response to receiving the request.

10. The computer program product of claim 7, the code further causes the apparatus to:
determine, from the current state of the supercomputer cluster, computational tasks currently being processed by the supercomputer cluster.

11. The computer program product of claim 7, wherein the code further causes the apparatus to:
determine that the request is a valid signed entry; and
transmit the request and the current state of the supercomputer cluster to a distributed hash table (DHT) associated with the data integrity engine.

12. The computer program product of claim 11, wherein the code further causes the apparatus to:

receive, from a plurality of peer computing nodes, an indication that the current state of the supercomputer cluster meets the reboot requirements;
determine that a total number of the plurality of peer computing nodes indicating that the current state of the supercomputer cluster meets the reboot requirements is greater than a predetermined threshold; and
determine a confirmation that the current state of the supercomputer cluster meets the reboot requirements in an instance in which the total number of the plurality of peer computing nodes is greater than the predetermined threshold.

13. A method an automated system for restarting large scale cluster supercomputers, the method comprising:
receiving a request to reboot a supercomputer cluster, wherein the request comprises a sequence of reboot instructions;
determining, using a data integrity engine, whether a current state of the supercomputer cluster meets reboot requirements, wherein the reboot requirements are associated with a core logic of the data integrity engine, wherein the data integrity engine is a holochain application; and
executing the sequence of reboot instructions in an instance where the current state of the supercomputer cluster meets the reboot requirements, wherein executing further comprises retrieving information associated with computational tasks currently being processed by the supercomputer cluster, wherein the information associated with the computational tasks comprises at least a task priority, a task criticality, a task duration, and computational resource requirement.

14. The method of claim 13, wherein the method further comprises:
receiving, from a user input device, the sequence of reboot instructions; and
storing the sequence of reboot instructions in a reboot sequence repository.

15. The method of claim 14, wherein the method further comprises:
receiving, from the user input device, the request to reboot the supercomputer cluster; and
retrieving, from the reboot sequence repository, the sequence of reboot instructions in response to receiving the request.

16. The method of claim 13, wherein the method further comprises:
determining, from the current state of the supercomputer cluster, computational tasks currently being processed by the supercomputer cluster.

* * * * *